F. H. LACEY.
RESILIENT WHEEL.
APPLICATION FILED JAN. 19, 1911.
1,025,473.
Patented May 7, 1912.
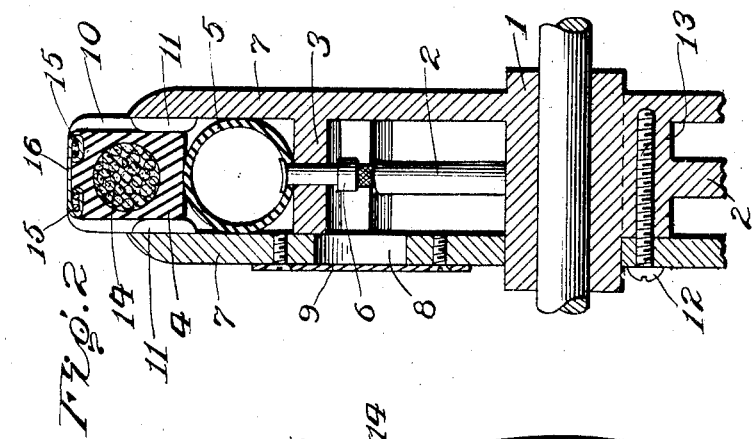
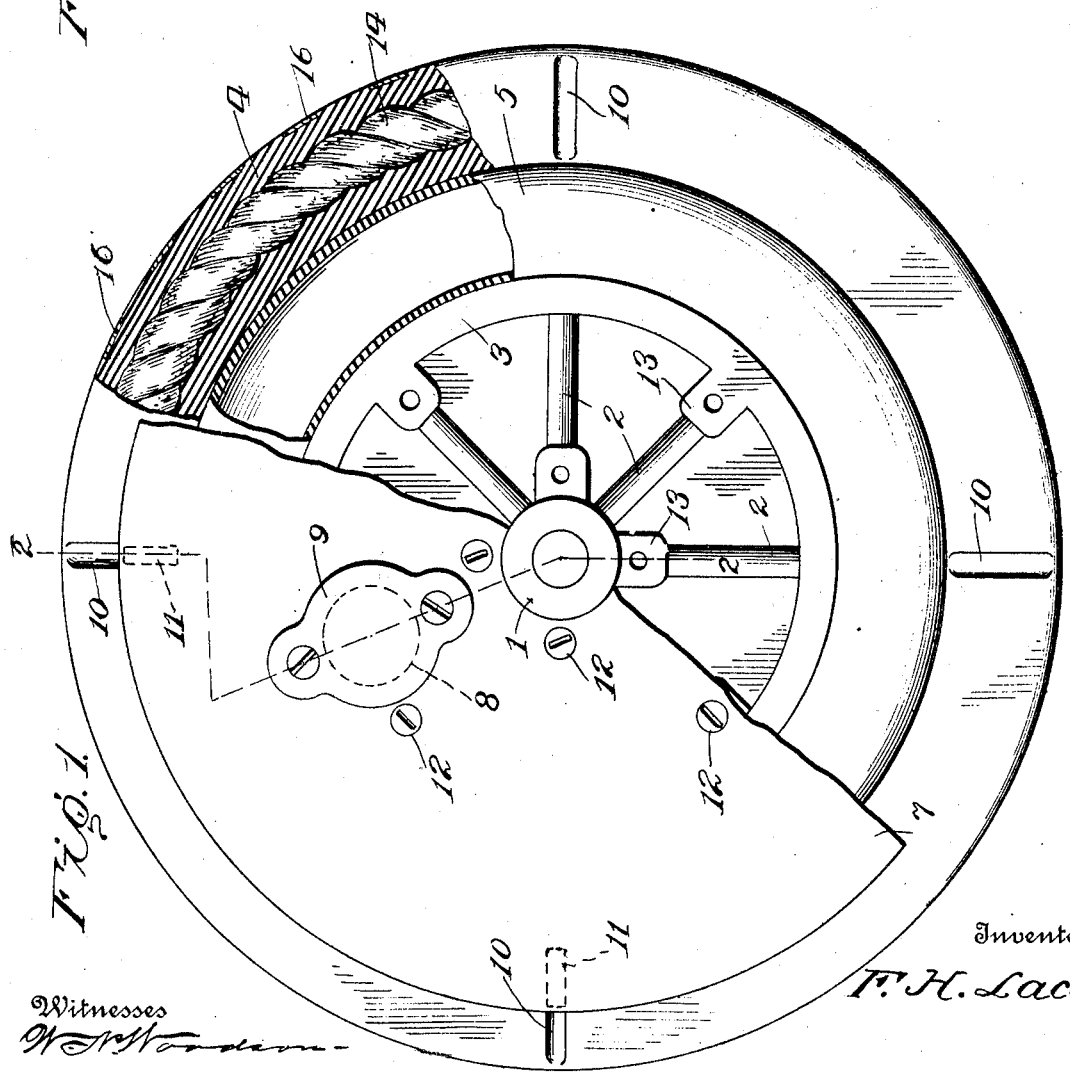
Witnesses
Inventor
F. H. Lacey
By
Attorneys

UNITED STATES PATENT OFFICE.

FRANCIS H. LACEY, OF RICHLAND, MISSOURI.

RESILIENT WHEEL.

1,025,473.  Specification of Letters Patent.  Patented May 7, 1912.

Application filed January 19, 1911. Serial No. 603,490.

*To all whom it may concern:*

Be it known that I, FRANCIS H. LACEY, a citizen of the United States, residing at Richland, in the county of Pulaski and State of Missouri, have invented certain new and useful Improvements in Resilient Wheels, of which the following is a specification.

The present invention comprehends certain new and useful improvements in resilient wheels for use on automobiles and other vehicles, and the object of the invention is to provide an improved wheel in which a pneumatic tube is interposed between the rim and the tire and yieldably supports the latter from the former so as to cause the wheel to absorb locally the shocks incident to travel, the pneumatic tube being thoroughly housed so as to be free from liability to puncture. I attain these and other objects by the structure illustrated in the accompanying drawing in which:

Figure 1 is a side elevation, partly in section, of a wheel embodying the improvements of my invention. Fig. 2 is a transverse section on the line 2—2 of Fig. 1.

Corresponding and like parts are referred to in the following description and indicated in all the views of the drawing by the same reference characters.

My improved wheel includes a hub 1, spokes 2, and a rim 3, it being understood that these parts may be of any desired or improved construction or design, except as hereinafter noted. A resilient tire 4 encircles the rim in the plane of the wheel and is of somewhat greater diameter than the rim in order to provide an intervening annular space for the reception of a pneumatic tube 5. A nipple 6 is provided to enable the tube to be inflated. By means of the pneumatic tube the tire is yieldably supported from the rim.

A pair of circular side plates or flanges 7 are provided on opposite sides of the wheel in concentric relation thereto, the plates being of sufficiently greater diameter than the rim to project outwardly therebeyond and partially overlap the tire 4. One of the side plates has a hand opening 8 extending therethrough to afford access to the nipple 6, the opening being normally closed through the instrumentality of a detachable cover plate 9. The inner or opposing faces of the side plates are perpendicular to the axis of rotation of the wheel and are substantially smooth and flat so as to fit evenly against the sides of the tire and pneumatic tube and thus confine said parts on the periphery of the wheel against lateral displacement. Of course the tire projects outwardly beyond the edges of the side plates and is capable of moving substantially radially inwardly therebetween in the operation of the wheel. In order to guide the tire in its radial movement and to hold the tire against independent circumferential movement, a plurality of radially disposed notches or recesses 10 are formed in each side of the tire and engage with correspondingly positioned radial ribs 11 on the inner faces of the side plates 7.

One of the side plates is rigid with the wheel, and if desired, the hub, spokes, rim and said side plate may all be cast in one piece. The other side plate is detachably mounted in position in any suitable manner so as to enable the pneumatic tube and tire to be conveniently assembled or removed as occasion requires. The detachable side plate is preferably fastened by a plurality of screws 12 engaged in threaded bores in enlargements 13 of the spokes. To this end alternate spokes of the series are enlarged in proximity to the rim while the remaining spokes of the series are enlarged in proximity to the hub, as shown.

The tire 4 consists of solid rubber which is molded about and entirely surrounds a reinforcing core 14 of a Manila rope. By employing a core the quantity of rubber required for the tire is reduced to a minimum and hence the tire may be cheaply manufactured. On account of its natural resiliency the rope core in nowise detracts from the resiliency of the tire. A flexible metallic shoe is embedded in the tread surface of the tire and consists of two transversely spaced chains 15 which are connected together at short intervals by a series of sheet metal armor plates or links 16. The shoe prevents the tire from being cut or otherwise injured when traveling over stony ground, and also reduces the wear on the tire and obviates the liability of slipping or skidding.

What I claim is:

A resilient wheel including a hub, a rim, a series of spokes, alternate spokes being enlarged in proximity to the rim and the remaining spokes of the series being enlarged adjacent to the hub, a pair of circular side plates disposed on opposite sides of the wheel and outstanding from the rim in transversely spaced relation, a tire encircling the rim and operating between the side plates, means interposed between the tire and the rim for yieldably supporting the former from the latter, one of the side plates being separable from the wheel, and fastening devices inserted through the separable side plate into the enlargements of the spokes.

In testimony whereof, I affix my signature in presence of two witnesses.

FRANCIS H. LACEY. [L. S.]

Witnesses:
J. W. ARMSTRONG,
O. H. BELSKE.